United States Patent [19]
Elliott, Jr.

[11] Patent Number: 5,925,848
[45] Date of Patent: Jul. 20, 1999

[54] CONCRETE STEP-IN ELECTRONIC CABINET SYSTEM

[75] Inventor: Thomas P. Elliott, Jr., Fort Worth, Tex.

[73] Assignee: Dalworth Concrete Products, Inc., Arlington, Tex.

[21] Appl. No.: 08/955,192

[22] Filed: Oct. 21, 1997

[51] Int. Cl.[6] .................................................. H02G 9/00
[52] U.S. Cl. ............................................. 174/38; 174/50
[58] Field of Search ................................ 174/37, 38, 50; 312/223.1, 100; 361/641, 659; 405/8, 53

[56] References Cited

U.S. PATENT DOCUMENTS

| | | | |
|---|---|---|---|
| 279,646 | 6/1883 | Hamilton | 174/38 X |
| 691,024 | 1/1902 | Vogel | 174/37 |
| 1,617,626 | 2/1927 | Fitzgerald | 174/38 X |
| 2,717,275 | 9/1955 | Hayden et al. | 174/37 |
| 2,724,968 | 11/1955 | Greene | 174/37 X |
| 4,541,209 | 9/1985 | Hoag | 174/37 X |
| 4,644,095 | 2/1987 | Bright et al. | 174/38 X |
| 4,709,120 | 11/1987 | Pearson | 174/37 X |
| 4,876,629 | 10/1989 | Phillips | 174/37 X |
| 5,136,463 | 8/1992 | Webster | 174/38 X |
| 5,235,133 | 8/1993 | Roth et al. | 174/37 |

*Primary Examiner*—Dean A. Reichard
*Attorney, Agent, or Firm*—Knobbe, Martens, Olson & Bear, LLP

[57] ABSTRACT

An electronics storage cabinet for housing cell equipment for cellular telephone services. The storage cabinet is partially buried so that it has a small above-ground profile. The small profile of the cabinet allows the cabinet to be located in an easement without the need to meet local building codes or obtain building permits. The partially buried configuration of the cabinet allows the cabinet to enclose a spacious work space that is large enough to store the electronics equipment and allow a person to stand upright. The cabinet desirably includes a secondary storage space located below a removable floor and a step.

26 Claims, 3 Drawing Sheets

CONCRETE STEP-IN ELECTRONIC CABINET SYSTEM

BACKGROUND OF THE INVENTION

1. Field of the Invention

The present invention relates to a storage cabinet for electronic equipment.

2. Description of the Related Art and Summary of the Invention

For some time, there has been rapid growth in the area of cellular telephone services, both in the volume of calls and in the geographical areas in which such services are offered. Efficient cellular telephone services require the placement of expensive and fragile cell electronics at various locations throughout the geographic service area. With this rapid growth, cellular telephone companies are using an increasing number of such cell electronics and have been attempting to find and secure suitable locations to house these electronics.

Cellular telephone companies locate the cell electronics in storage housings. The housing typically comprises a small cabinet that defines a storage space in which the electronics are located. The housing must provide shelter to the cell electronics against conditions such as rain, wind, and temperature variations, as the cell electronics are highly susceptible to damage from water and may also be damaged by extreme temperatures. In addition to the sensitive cell electronics, the units are typically provided with at least eight storage batteries to power the cell site in the event of a power failure. The standard size for these storage batteries is approximately 11"×6¾"×13⅝". While the storage batteries rarely require repair, they also require protection from the elements and occasionally must be replaced.

Some companies are building above-ground storage housings and locating the housings on easements. However, if the housing exceeds a certain size, generally greater than 6 feet in height, 8 feet in width, and 10 feet in depth, the housing is deemed a "structure" under most building codes. The builder must therefore design the housing to meet building codes, obtain a building permit and also have the housing inspected to ensure that the housing complies with local building codes. As building codes are generally not written with the requirements of cell electronics housings in mind, building the housing to meet the codes will often unnecessarily increase the cost of the housing. The permit process also adds costs and is time-consuming.

There are also other drawbacks to locating the housing within an easement. Specifically, easements are usually narrow, which limits the available dimensions of the housing. Also, because a third party owns the land on which the easement is located, there is typically an absolute prohibition against building a housing that exceeds certain dimensions so as not to interfere with the land owner's use and enjoyment of the land.

To avoid the foregoing problems associated with larger structures, the electronics housings are typically built as small as possible. The housings are therefore cramped and are barely large enough to store and protect the sensitive electronic equipment. If maintenance or repairs on the electronic equipment is performed during inclement weather, such as during rainstorms, the service person must uncomfortably stand in the rain and also risk water damage to the electronic equipment. Unfortunately, equipment failure often occurs or is detected during inclement weather.

Other types of electronic cell housings are buried completely below ground in easements. This allows the housing to be built larger while avoiding the permits and building codes that are associated with above-ground housings. However, there are several drawbacks associated with these housings. For instance, the construction of an underground housing is difficult and costly. The installer must dig a large and deep hole which requires the leasing or purchasing of special digging equipment, as well as trained personnel to operate the equipment. The installer must also use special shoring equipment to support the hole against collapsing during construction of the housing. Additionally, as the depth of the hole increases, the likelihood of encountering underground water also increases, which makes construction even more difficult.

There are also several disadvantages after the underground housing is built. Water located underground often corrodes the walls of the housing. The water can leak through the walls and enter the storage space and damage the sensitive equipment. Additionally, the water can leak into the housing when the door of the housing is opened during rain storms. There is also a risk of the housing collapsing from the weight of the soil on the structure.

Companies also locate the cell electronics housings on private property in an attempt to avoid some of the problems associated with storing the electronics on easements. By locating the electronics housings on private property, companies may build a larger housing that has ample space for the electronic equipment and for personnel and at the same time avoid the limitations on size associated with easements. Unfortunately, if the size of the housing exceeds certain dimensions, the housing will still be covered by standard building codes, resulting in the associated added costs and delays. Additionally, the use of private property for storing cell electronics is very expensive. The company must either pay to purchase the property or pay to lease the property. Such costs are highly undesirable in the extremely competitive industry of cellular telephone services.

Cellular telephone companies are thus faced with the dilemma of choosing between a variety of undesirable alternatives regarding storage of the rapidly increasing number of cell electronics.

There is therefore a need for a storage housing for electronic cell equipment that does not suffer from the aforementioned drawbacks. The housing should provide ample storage space for cell electronics and also allow enough room for a service person to step into the housing and stand upright during maintenance. While providing such ample space, the housing should also be small enough to be located on an easement. Additionally, the housing should provide reliable protection for the electronic equipment by preventing leaking or water spillage into the housing during inclement weather.

One aspect of the invention is an electronic storage cabinet including a housing defining an exterior envelope and enclosing an interior space. A support surface is positioned within the housing. The interior space of the housing is sized to accommodate an electronics rack and a person standing upright on the support surface. The housing includes partially buried sidewalls, a top wall above ground level, a bottom wall spaced below ground level, and a support surface space below ground level. At least one of the walls defines a door opening having a lower edge spaced above ground level and a door connected to the housing positioned within the opening.

A first portion of the housing extends above ground level and a second portion of the housing is buried below ground level, with the second portion of the housing desirably being water-proof. Advantageously, the lower portion of the housing extends to a depth of no more than 42 inches below the ground surface for ease of installation, and to avoid extending below the water table. Advantageously, the upper portion of the housing extends no more than 72 inches above the ground surface to minimize the above-ground profile of the cabinet.

Desirably, the support surface has an area of at least 8 square feet to provide a comfortable amount of space for the worker to stand or kneel upon while performing repairs. The cabinet may advantageously include a storage space below the support surface, which can be accessed by a removable first floor. Desirably, the removable first floor has a width of at least 36 inches and a depth of at least 30 inches, thereby permitting a standard electronic storage battery to be removed therefrom. Similarly, this storage space desirably has a height of at least 12 inches to permit the storage of such batteries in such storage space, and a volume of at least 7.5 cubic feet to facilitate at least 8 storage batteries being stored within the storage area.

Advantageously, the sidewalls comprise concrete and the second portion of the cabinet is coated with a water-proof coating. The cabinet can be provided with a step between the support surface and the lower edge of the door opening to facilitate safe access to the support surface, particularly when carrying tools or other equipment. Advantageously, the step is removable without tools to permit the removable first floor to be made larger, thereby further facilitating the removal of storage batteries from the cabinet.

Another aspect of the invention is an electronic storage cabinet, including a housing having the first portion positioned above ground level and a second portion positioned below ground level. The first portion defines an exterior envelope having a height no greater than 72 inches, a width no greater than 96 inches and a depth no greater than 96 inches. The second portion defines a height no greater than 36 inches and encloses an interior space. The interior space defines a work space and a first storage space. The work space has a height of at least 77 inches to permit a worker to stand on the support surface to perform maintenance on electronic equipment stored within the first storage space. The first storage space has a height of at least 77 inches, a width of at least 36 inches and a depth of at least 24 inches. The housing defines a door opening at least 3 inches above ground level and a door connected to the housing to substantially seal the housing against inclement weather when the door is shut.

Desirably, the second portion of the cabinet defines a width no greater than 96 inches and a depth no greater than 96 inches, to minimize the amount of digging necessary to install the storage cabinet. Desirably, the cabinet defines a support surface upon which a worker may stand and a secondary storage area located below the support surface. Preferably, the work space has a width of at least 36 inches and a depth of at least 30 inches to facilitate ease of worker movement within the cabinet. Similarly, the first storage space desirably has a width of at least 36 inches and a depth of at least 24 inches, to provide adequate storage space for the electronics. Advantageously, the cabinet defines a removable floor having a width of at least 36 inches and a depth of at least 30 inches to facilitate the removable of standard storage batteries from the secondary storage space.

BRIEF DESCRIPTION OF THE DRAWINGS

These and other features of the invention will now be described with reference to the drawings, which are intended to illustrate and not to limit the invention, and in which.

DETAILED DESCRIPTION OF THE PREFERRED EMBODIMENT

Figure 1:
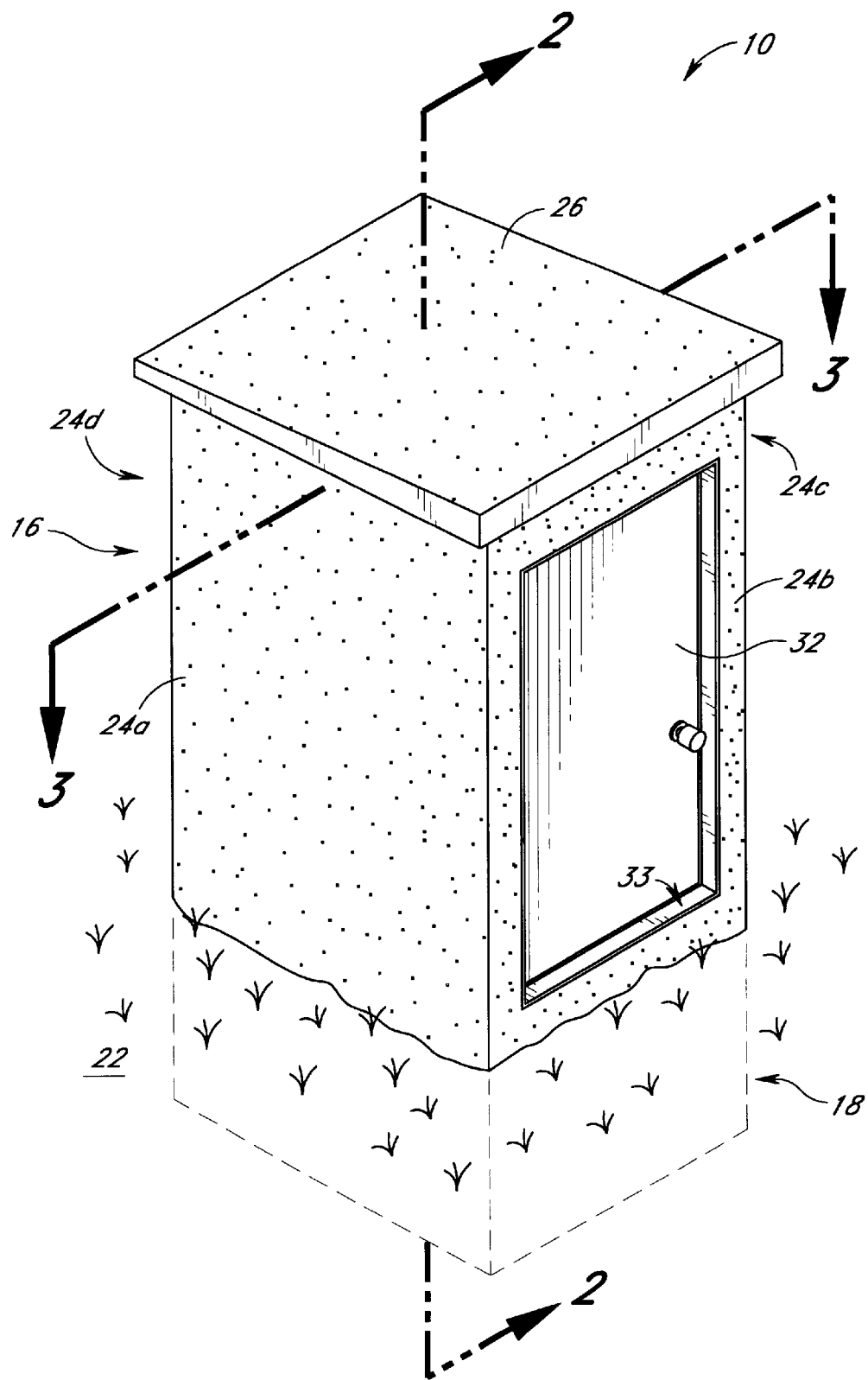
FIG. 1 is a perspective view of an electronics storage cabinet configured in accordance with one embodiment of the present invention.

FIG. 1 is a perspective view of an electronics storage cabinet 10 configured in accordance with one embodiment of the present invention. The electronics storage cabinet 10 partially extends above a grade or ground surface 22. Specifically an upper portion 16 of the electronics storage cabinet 10 is above the ground surface 22 and a lower portion 18 (FIG. 2) of the electronics storage cabinet 10 extends below the ground surface 22. The upper portion 16 of the electronics storage cabinet 10 is sized such that the electronics storage cabinet 10 is not considered a "structure" with respect to building codes, zoning laws, and permit requirements. Importantly, the portion of the housing 10 below ground doesn't contribute to the above-ground dimensions.

Figure 2:
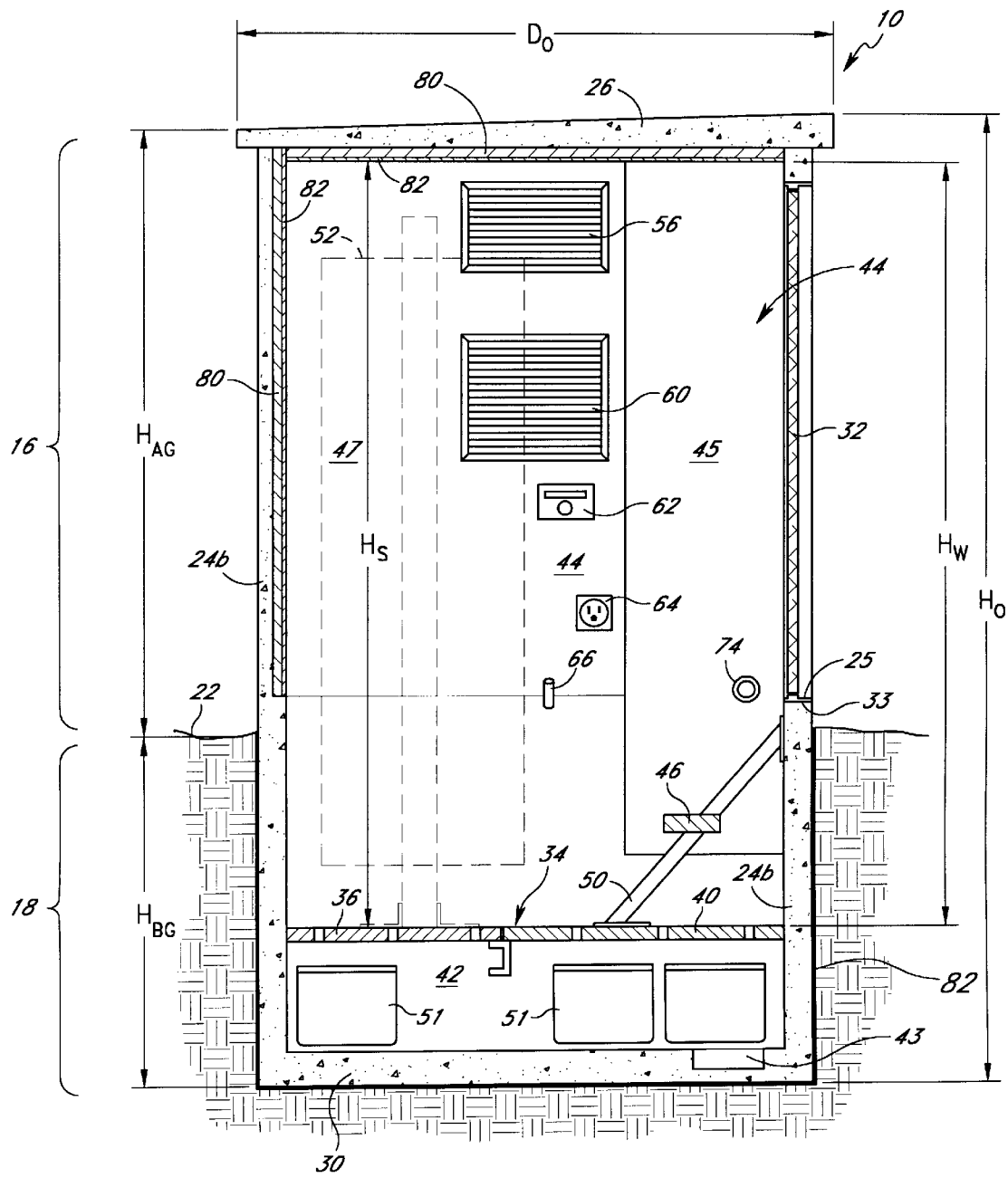
FIG. 2 is a cross-sectional side view of the storage cabinet of FIG. 1 along line 2—2.
Figure 3:
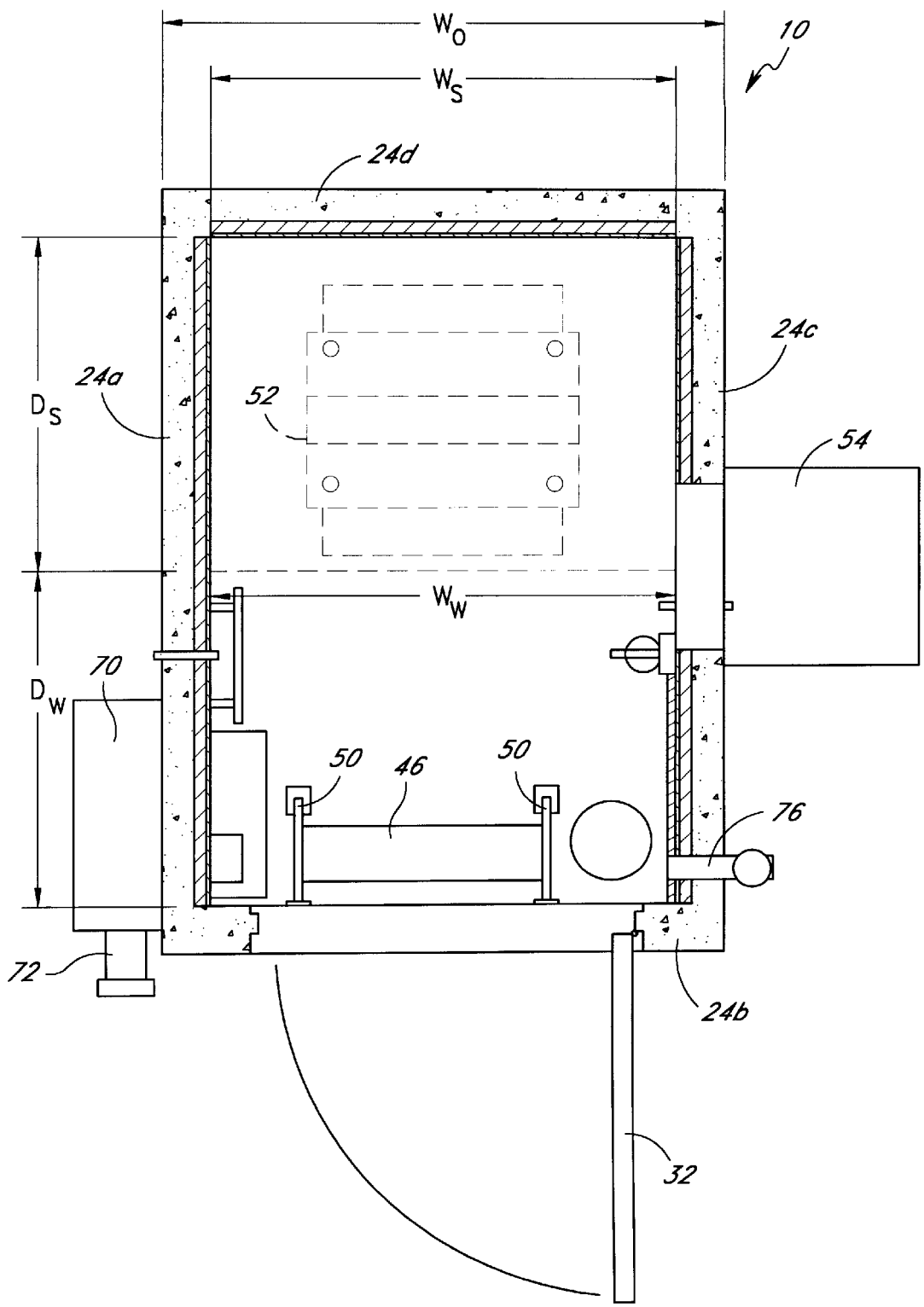
FIG. 3 is a cross-sectional top view of the storage cabinet of FIG. 1 along line 3—3.

As shown, the electronics storage cabinet has a height $H_o$ (FIG. 2), a depth $D_o$ (FIG. 2), and a width $W_o$ (FIG. 3). The height $H_o$ of the electronic storage cabinet 10 is at least 8.25 feet, desirably 8.66 feet, and preferably 9.50 feet. The depth $D_o$ of the electronic storage cabinet 10 is at least 5.50 feet, desirably 5.83 feet, and preferably 8.33 feet. The width $W_o$ of the electronic storage cabinet 10 is at least 4.0 feet, desirably 6.0 feet, and preferably 8.0 feet.

The upper portion 16 defines an above-ground envelope of space. Specifically, the upper portion extends to a height $H_{AG}$ (FIG. 2) above the ground surface 22. The above-ground height $H_{AG}$ of the electronics storage cabinet does not exceed 84 inches, desirably does not exceed 78 inches, and preferably does not exceed 72 inches. However, the storage cabinet should still define an interior space that is sized to store electronic cell equipment and also allow a person to stand upright within the electronics storage cabinet 10, as described more fully below.

As shown in FIG. 1, the electronics storage cabinet 10 is substantially box-shaped and has rectangular cross-sections. The electronics storage cabinet 10 generally comprises a housing including four substantially flat side walls 24a–24d and a roof or top wall 26 that defines the upper surface of the electronics storage cabinet 10. The upper surface of the roof is tapered to one side or both so that water does not accumulate on top of the electronics storage cabinet 10 when it rains. A bottom wall or bottom 30 (FIG. 2) encloses the lower end of the electronics storage cabinet and also defines its bottom surface. For convenience, the side walls are referred to collectively as "side walls 24" and individually using an "a," "b," "c," or "d" suffix.

A door 32 is pivotably mounted in an opening in the side wall 24b in a well known manner. The door 32 desirably forms a water resistant seal with a door jam 25 mounted on an edge 33 of the wall 24b which forms the door opening which is desirably located above the ground surface 22. Desirably, the edge 33 of the side wall 24b forming the opening extends upward at least 3 inches, and preferably 4 inches, from the ground surface 22.

FIGS. 2 and 3 are cross-sectional side and top views, respectively, of the electronics storage cabinet 10. As shown in FIG. 2, the electronics storage cabinet 10 defines an interior space having a substantially rectangular shape. As mentioned, the lower portion 18 of the electronics storage cabinet 10 is buried and extends below the level of the ground surface 22. The lower portion 18 desirably has a below ground height $H_{BG}$ of no more than 4 feet, and preferably no more than 3.5 feet, below the ground surface 22 in order to reduce the need for special digging equipment or shoring material during construction of the electronics storage cabinet 10 and to reduce the risk of extending below the water table.

As shown in FIG. 2, a floor 34 extends across the interior volume of the electronics storage cabinet 10 below the edge 33 of the wall 24b and the level of the ground surface 22. The floor 34 is desirably positioned at least 12 inches below the edge 33, and preferably at least 24 inches below the edge 33. The floor 34 desirably comprises at least one fixed floor panel 36 that is secured to the walls of the electronic storage cabinet so as to be non-removable. The floor 34 further comprises a removable floor panel 40 adjacent the fixed floor panel 36. The removable floor panel 40 is preferably sized and configured to be lifted upward without tools to expose a covered peripheral storage space 42, as described more fully below.

A plurality of apertures extend through the floor 34 to allow any water to drain out of the electronics storage cabinet 10 and thereby inhibit any water from accumulating therein and damaging the electronics. A sump 43 may be located on the bottom of the storage space to collect the drained water. If desired, a pump may also be provided to pump out the collected water.

As illustrated in FIG. 2, an interior space 44 is defined within the side walls 24 of the electronics storage cabinet 10 between the floor 34 and the top wall 26. The interior space 44 should be large enough to provide ample storage space for electronic cell equipment, as well as space for a person to stand upright next to the cell equipment. The interior space 44 thus comprises a work space 45 for a maintenance worker and a main storage space 47 for electronic cell equipment. The work space 45 generally comprises the area of the interior space 44 that is not consumed by the electronic cell equipment.

The work space 45 is desirably tall enough such that a person may stand upright and maneuver within the work space 45. The work space 45 has a height $H_w$ (FIG. 2), a depth $D_w$ (FIG. 3), and a width $W_w$ (FIG. 3). The height $H_w$ of the work space 45 is at least 6.42 feet, and preferably at least 6.5 feet. The width $W_w$ of the work space 45 is at least 3.0 feet, and preferably at least 3.25 feet. The depth $D_w$ of the work space 45 is at least 2.5 feet, and preferably at least 3.0 feet.

In the illustrated embodiment, a step 46 is positioned between the door 32 and the floor 34 to allow a person to easily enter the work space 45 and step down onto the floor 34. The step 46 is mounted on a pair of support members 50 that extend diagonally from the side wall to the floor 34. The step 46 and support members 50 are preferably removable to facilitate removal of the removable floor panel 40.

As mentioned, the floor 34 also defines a peripheral storage space 42 between the lower surface of the floor 34 and the bottom wall 30 of the electronics storage cabinet 10. As shown in FIG. 2, the peripheral storage space 42 advantageously provides space for storage of peripheral equipment 51, such as cell batteries or tools. The peripheral storage space 42 desirably extends across the entire bottom wall 30 to provide room for at least 8 batteries having a size of approximately 11"×6¾"×13⅝". The removable floor panel 40 desirably has a size that allows the removal of such batteries when the removable floor panel 40 is removed. The height of the peripheral storage space 42 is at least 1.0 feet, and preferably 1.5 feet.

As shown in FIGS. 2 and 3, an electronics rack 52 (shown in phantom lines) is located within the main storage space 47 on the fixed floor panel 36. The electronics rack 52 is desirably located on the side of the electronics storage cabinet 10 opposite the location of the door 32 to allow maintenance workers access to the work space 45 when entering the electronics storage cabinet 10. The electronics rack 52 comprises a base portion and a series of panel spaces for the storage of cell electronics. Each panel space is approximately 1¾ inches tall and 19–23 inches wide.

The main storage space 47 is desirably sized to house up to two adjacent electronic racks 52 in order to minimize the overall size of the electronics storage cabinet 10. However, a greater number of electronic racks may be positioned within the main storage space 47 by increasing the size of the electronics storage cabinet 10. In one embodiment, the electronics rack is approximately 84 inches tall.

The main storage space 47 has a height $H_s$ (FIG. 2), a width $W_s$ (FIG. 3), and a depth $D_s$ (FIG. 3). The height $H_s$ of the main storage space 47 is at least 6.42 feet, and preferably 6.5 feet. The width $W_s$ of the main storage space 47 is at least 3.0 feet, and preferably 3.25 feet. The depth $D_s$ of the main storage space 47 is at least 2.0 feet, and preferably 2.25 feet.

With reference to FIG. 2, the electronics storage cabinet 10 is also desirably provided with a thermostat 62 to maintain a suitable temperature for operation of the cell electronics. The thermostat 62 controls the operation of an air conditioning unit 54 that is located on the outer surface of the side wall 24c. The air conditioning unit 54 provides cooling air to the interior space 44 through an inlet vent 56 on the side wall 24c (FIG. 2). An outlet vent 60 also communicates with the air conditioning unit 54 and is located on the side wall 24c adjacent the inlet vent 56. A constant operating temperature for the electronics equipment may be maintained within the electronics storage cabinet via the thermostat 62 and air conditioning unit 54.

Referring to FIGS. 2 and 3, the electronics storage cabinet 10 may be provided with any of a wide variety of equipment, such as for providing electrical power. For example, as shown in FIG. 2, the electronics storage cabinet 10 includes an electrical outlet port 64 on the side wall 24c to provide a ready source of electrical power to the electronics storage cabinet 10. A ground sleeve 66 is also located adjacent the electrical outlet port 64. As shown in FIG. 3, the electronics storage cabinet 10 further includes a service panel 70 with emergency power breakers on the outer surface of the side wall 24a. The service panel 70 includes a generator receptacle 72. A telephone company or "telco" port 74 with an entry conduit 76 extends through the side wall. The electronics storage cabinet 10 could also be provided with other optional features, such as lighting fixtures or plumbing.

In use, a maintenance worker opens the door 32 to gain access to the work space 45. As shown in FIGS. 2 and 3, the door 32 pivots about a vertical axis from a closed position to an open position. Because the edge 33 of wall 24b is always spaced above the ground surface 22, the likelihood of water seeping into the electronics storage cabinet when the door 32 is open is greatly reduced. Even if the ground surface 22 is saturated such that water pools have formed around the perimeter of the electronics storage cabinet, the side wall 24b provides a barrier to prevent water from seeping into the electronics storage cabinet 10 and damaging the electronics. The electronics storage cabinet 10 thus provides increased protection to the cell electronics if they are being serviced during inclement weather.

Even if water leaks into the electronics storage cabinet 10, the likelihood of damage occurring to the cell electronics is reduced because of the location of the storage rack 52 in the elevated interior space 44. As mentioned, a plurality of apertures extend through the floor 34 to allow any water to drain out of the interior space 44 so as not to damage the cell electronics. Any drained water is collected in the sump 43 in the peripheral storage space 42.

The worker uses the step 46 to step down onto the floor 34. As shown in FIGS. 2 and 3, the floor 34 provides room for the worker to stand upright within the work space next to the electronics rack 52 and service the cell electronics. Desirably, the floor 34 provides at least 7.50 square feet of free floor space aside from the space consumed by the electronics rack 52 to allow space for the worker to maneuver comfortably. Because the work space 45 is entirely enclosed, it provides sheltered protection to both the electronic equipment and the worker during bad weather conditions.

The maintenance workers may advantageously work on the cell electronics within the enclosed work space 45 with the peripheral equipment 51 stored out of the way in the peripheral storage space 42. When desired, the maintenance workers can access the peripheral equipment 51 by removing the removable floor panel 40 to reveal the peripheral storage space 42 and its contents. Thus, the peripheral equipment advantageously does not consume any of the work space 45. Although not preferred, it will be appreciated that the peripheral storage space 42 could be eliminated from the electronics storage cabinet 10 in order to increase the available volume for the work space 45 or to reduce the required depth of the bottom wall 30.

Because only the lower portion 18 of the electronics storage cabinet 10 is buried, the electronics storage cabinet 10 does not exhibit the drawbacks associated with a fully-buried enclosure. For instance, a smaller hole is dug during construction to thereby reduce the likelihood of encountering underground water. The smaller hole also reduces the need for special shoring equipment or digging equipment and personnel during construction. The partially-buried configuration also allows the electronics storage cabinet 10 to enclose a suitably large interior volume while still maintaining a small profile above the ground so that the upper portion 16 of the electronics storage cabinet 10 is small enough to be exempt from building codes and to be located within easements.

The side walls 24, top wall 26, and bottom wall 30 are desirably manufactured of a strong material that is resistant to water damage, such as when it is raining. In one embodiment, the walls are manufactured of 8,000 psi concrete and are approximately 3–4 inches thick. The interior of the side walls 24 are lined with a layer of insulation 80 (FIG. 2), such as 1¼ inch thick poly-iso board insulation that is secured to the side walls 24 using ½ inch plywood with an FRP bonded interior finish. The concrete walls of the electronics storage cabinet 10 provide a sturdy enclosure for the electronic equipment housed therein. The walls are resistant to damage from wind or rain during inclement weather. The insulation 80 inhibits heat from passing through the walls so as to maintain a constant temperature for the electronic cell equipment.

The exterior bottom and sides of the buried lower portion 18 of the electronics storage cabinet 10 are desirably coated with a water proof material 82, such as coal tar epoxy, to resist water leakage through the buried lower portion 18 and to also resist corrosion of the lower portion 18. Although the electronics storage cabinet 10 is buried to a relatively shallow depth such that underground water deposits are not likely to be encountered, the coal tar epoxy also provides protection against water that seeps downward from the ground surface 22. In this manner, the electronics equipment within the electronics storage cabinet 10 is provided additional protection.

In one embodiment, the height $H_o$ electronics storage cabinet 10 is approximately 9½ feet from the exterior surface of the top wall 26 to the exterior surface of the bottom wall 30. The upper portion 16 extends to a height $H_{AG}$ of approximately 6 feet upward from the level of the ground. The exterior of the bottom wall 30 of the lower portion 18 is buried to a depth of approximately 3½ feet. The work space 45 is approximately 7½ feet tall to provide room for most people to walk upright. The peripheral storage space 42 is approximately 1 foot tall. The dimensions of the electronics storage cabinet 10 may be varied to provide various work space 45 and peripheral storage space 42 volumes. However, the dimensions of the upper portion of the electronics storage cabinet 10 preferably do not exceed a height above ground $H_{AG}$ of 6.0 feet, a width $W_o$ of 8.0 feet, and a depth $D_o$ of 8.0 feet in order to avoid the electronics storage cabinet 10 being classified as a structure under most local building codes.

The electronics storage cabinet 10 provides cellular telephone service providers with a convenient storage space for electronic cell equipment. Due to the small size of the above-ground profile, the electronics storage cabinet 10 is not considered a structure and can be located in an easement without the need to meet local building codes or obtain building permits. The partially buried lower portion 18 provides an interior space 44 that is large enough to store an electronics rack 52 while still providing room for a work person to maneuver and stand upright. However, because only a portion of the cabinet is buried, the electronics storage cabinet 10 does not exhibit the drawbacks of a fully-buried unit. The electronics storage cabinet 10 thus allows a cell phone company to store and maintain electronic cell equipment and minimize the costs and time typically associated with prior units.

Although the foregoing description of the preferred embodiment of the preferred invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope, of the present invention should not be limited by the foregoing discussion, which is intended to illustrate rather than limit the scope of the invention.

What is claimed is:

1. An electronics storage cabinet, comprising a housing defining an exterior envelope and enclosing an interior space, a first portion of the housing extending above ground level no more than 72 inches and a second portion of the housing buried below ground level to a depth of no more than 42 inches, a support surface within said housing, said support surface having an area of at least 7.5 square feet, a storage space being positioned below said support surface, said interior space sized to accommodate an electronics rack and a person standing upright on said support surface, the housing comprising partially buried side walls, a top wall above ground level, a bottom wall spaced below ground level, said support surface spaced below ground level, wherein at least one of the side walls defines a door opening having a lower edge spaced above ground level, and a door connected to said housing positioned within said opening.

2. The electronics storage cabinet of claim 1, wherein at least a portion of said support surface is defined by a removable first floor.

3. The electronics storage cabinet of claim 2, wherein said removable first floor has a width of at least 36 inches and a depth of at least 30 inches.

4. The electronics storage cabinet of claim 3, wherein said storage space has a height of at least 12 inches.

5. The electronics storage cabinet of claim 4, wherein said storage space defines a volume of at least 7.5 cubic feet.

6. The electronics storage cabinet of claim 4, wherein said side walls comprise concrete and said second portion of said cabinet is coated with a waterproof coating.

7. The electronics storage cabinet of claim 4, additionally comprising a step between said support surface and said lower edge of said door opening.

8. The electronics storage cabinet of claim 7, wherein said step is manually removable without tools.

9. The electronics storage cabinet of claim 7, wherein the lower edge of said door opening is at least 3 inches above ground level.

10. The electronics storage cabinet of claim 7, wherein the interior space has a height of at least 77 inches.

11. The electronics storage cabinet of claim 10, wherein the interior space has a volume of at least 38.5 cubic feet.

12. An electronics storage cabinet, comprising a housing defining an exterior envelope and enclosing an interior space, a support surface spaced below ground level within said housing, said interior space sized to accommodate an electronics rack and a person standing upright on said support surface, a storage space being positioned beneath the support surface, the housing comprising partially buried side walls, a top wall above ground level, a bottom wall spaced below ground level, wherein at least one of the side walls defines a door opening having a lower edge spaced above ground level, and a door connected to said housing positioned within said opening.

13. The electronics storage cabinet of claim 12, wherein a first portion of the housing extends above ground level and a second portion of the housing is buried below ground level, said second portion of said housing being waterproof.

14. The electronics storage cabinet of claim 13, wherein the second portion of the housing extends to a depth of no more than 42 inches below the ground surface.

15. The electronics storage cabinet of claim 14, wherein the first portion of the housing extends no more than 72 inches above the ground surface.

16. The electronics storage cabinet of claim 15, wherein said support surface has an area of at least 7.5 square feet.

17. The electronics storage cabinet of claim 16, wherein at least a portion of said support surface is defined by a removable first floor.

18. The electronics storage cabinet of claim 17, wherein said removable first floor has a width of at least 36 inches and a depth of at least 30 inches.

19. The electronics storage cabinet of claim 18, wherein said storage space has a height of at least 12 inches.

20. The electronics storage cabinet of claim 19, wherein said storage space defines a volume of at least 7.5 cubic feet.

21. The electronics storage cabinet of claim 19, wherein said side walls comprise concrete and said second portion of said cabinet is coated with a waterproof coating.

22. The electronics storage cabinet of claim 19, additionally comprising a step between said support surface and said lower edge of said door opening.

23. The electronics storage cabinet of claim 22, wherein said step is manually removable without tools.

24. The electronics storage cabinet of claim 22, wherein the lower edge of said door opening is at least 3 inches above ground level.

25. The electronics storage cabinet of claim 22, wherein the interior space has a height of at least 77 inches.

26. The electronics storage cabinet of claim 25, wherein the interior space has a volume of at least 38.5 cubic feet.

* * * * *

UNITED STATES PATENT AND TRADEMARK OFFICE
CERTIFICATE OF CORRECTION

PATENT NO.     : 5,925,848
DATED          : July 20, 1999
INVENTOR(S)    : Thomas T. Elliot, Jr.

It is certified that error appears in the above-identified patent and that said Letters Patent is hereby corrected as shown below:

Column 6,
Line 30, "Fig. 2" should be -- Figure 3 --
Line 47, "wall 24c" should be -- wall 34c --

Signed and Sealed this

Fifth Day of November, 2002

Attest:

JAMES E. ROGAN
Attesting Officer    Director of the United States Patent and Trademark Office